(12) United States Patent
Yokoyama et al.

(10) Patent No.: US 12,134,429 B2
(45) Date of Patent: Nov. 5, 2024

(54) AUXILIARY POWER SUPPLY APPARATUS AND ELECTRIC POWER STEERING SYSTEM

(71) Applicant: HONDA MOTOR CO., LTD., Tokyo (JP)

(72) Inventors: Wataru Yokoyama, Kariya (JP); Yuhei Matsuo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 489 days.

(21) Appl. No.: 17/377,596

(22) Filed: Jul. 16, 2021

(65) Prior Publication Data

US 2022/0024514 A1  Jan. 27, 2022

(30) Foreign Application Priority Data

Jul. 27, 2020 (JP) .................. 2020-126538

(51) Int. Cl.
*B62D 5/04* (2006.01)
*B60Q 9/00* (2006.01)

(52) U.S. Cl.
CPC ............ *B62D 5/0475* (2013.01); *B60Q 9/00* (2013.01); *B62D 5/0481* (2013.01)

(58) Field of Classification Search
CPC .... B62D 5/0475; B62D 5/0481; B62D 5/046; B62D 5/0484; B60Q 9/00; B60R 16/03
See application file for complete search history.

(56) References Cited

U.S. PATENT DOCUMENTS

2001/0027895 A1* 10/2001 Murata .................. B62D 1/166
                                                        180/446
2020/0269913 A1* 8/2020 Fujimoto ............. B62D 5/0484

FOREIGN PATENT DOCUMENTS

JP    2007-045388 A     2/2007
JP    2009078737 A   *  4/2009
JP    2017052473 A   *  3/2017

* cited by examiner

*Primary Examiner* — Aniss Chad
*Assistant Examiner* — Chase L Cooley
(74) *Attorney, Agent, or Firm* — IP Spring

(57) ABSTRACT

An auxiliary power supply apparatus is disposed on a power supply path from a main power supply apparatus to an electric power steering apparatus. The auxiliary power supply apparatus includes an auxiliary power supply that is a rechargeable power storage device, an on-off switch that is configured to selectively disconnect or connect the electric power steering apparatus and the auxiliary power supply from or to the main power supply apparatus, and an operation unit that is configured to operate the on-off switch. The operation unit is configured to switch the on-off switch from an ON state to an OFF state on a condition that a voltage supplied to the auxiliary power supply apparatus from the main power supply apparatus is less than or equal to a specified voltage reduction determination value and a vehicle speed is greater than a specified low vehicle speed determination value.

4 Claims, 2 Drawing Sheets

AUXILIARY POWER SUPPLY APPARATUS AND ELECTRIC POWER STEERING SYSTEM

CROSS REFERENCE TO RELATED APPLICATION

The present application claims priority under 35 U.S.C. § 119(a) to Japanese Patent Application No. 2020-126538, filed on Jul. 27, 2020, which is incorporated herein by reference in its entirety.

BACKGROUND

1. Field

The present disclosure relates to an auxiliary power supply apparatus and an electric power steering system.

2. Description of Related Art

Systems mounted on a vehicle include an electric power steering system that uses a motor to generate a steering force, which is used to assist a driver in steering and to perform automatic steering. Japanese Laid-Open Patent Publication No. 2007-045388 discloses an electric power steering system that includes a main power supply and an auxiliary power supply, which supplies power when the supply voltage of the main power supply drops.

The electric power steering system of the above-described publication is capable of continuing the operation of the electric power steering system with the power supplied by the auxiliary power supply even when the supply voltage of the main power supply drops. However, taking the costs into consideration, the capacity of the auxiliary power supply, which is used only in limited situations, is preferably minimized.

SUMMARY

Accordingly, it is an objective of the present disclosure to provide an auxiliary power supply apparatus and an electric power steering system that are capable of reducing the capacity of an auxiliary power supply.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an auxiliary power supply apparatus is disposed on a power supply path from a main power supply apparatus to an electric power steering apparatus. The auxiliary power supply apparatus includes an auxiliary power supply that is a rechargeable power storage device, an on-off switch that is configured to selectively disconnect or connect the electric power steering apparatus and the auxiliary power supply from or to the main power supply apparatus, and an operation unit that is configured to operate the on-off switch. The operation unit is configured to switch the on-off switch from an ON state to an OFF state on a condition that a voltage supplied to the auxiliary power supply apparatus from the main power supply apparatus is less than or equal to a specified voltage reduction determination value and a vehicle speed is greater than a specified low vehicle speed determination value.

In another general aspect, an electric power steering system includes a steering motor that is configured to generate a steering force of a vehicle when supplied with power, a main power supply apparatus configured to supply the power to the steering motor, an auxiliary power supply that is a rechargeable power storage device, an on-off switch that is configured to selectively disconnect or connect the steering motor and the auxiliary power supply from or to the main power supply apparatus, and an operation unit that is configured to operate the on-off switch. The operation unit is configured to switch the on-off switch from an ON state to an OFF state on a condition that a voltage supplied to the steering motor from the main power supply apparatus is less than or equal to a specified voltage reduction determination value and a vehicle speed is greater than a specified low vehicle speed determination value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An auxiliary power supply apparatus and an electric power steering system according to one embodiment will be described with reference to FIGS. 1 to 3. The auxiliary power supply apparatus and the electric power steering system according to the present embodiment are mounted on a vehicle that uses an engine as a drive source.

Figure 1:
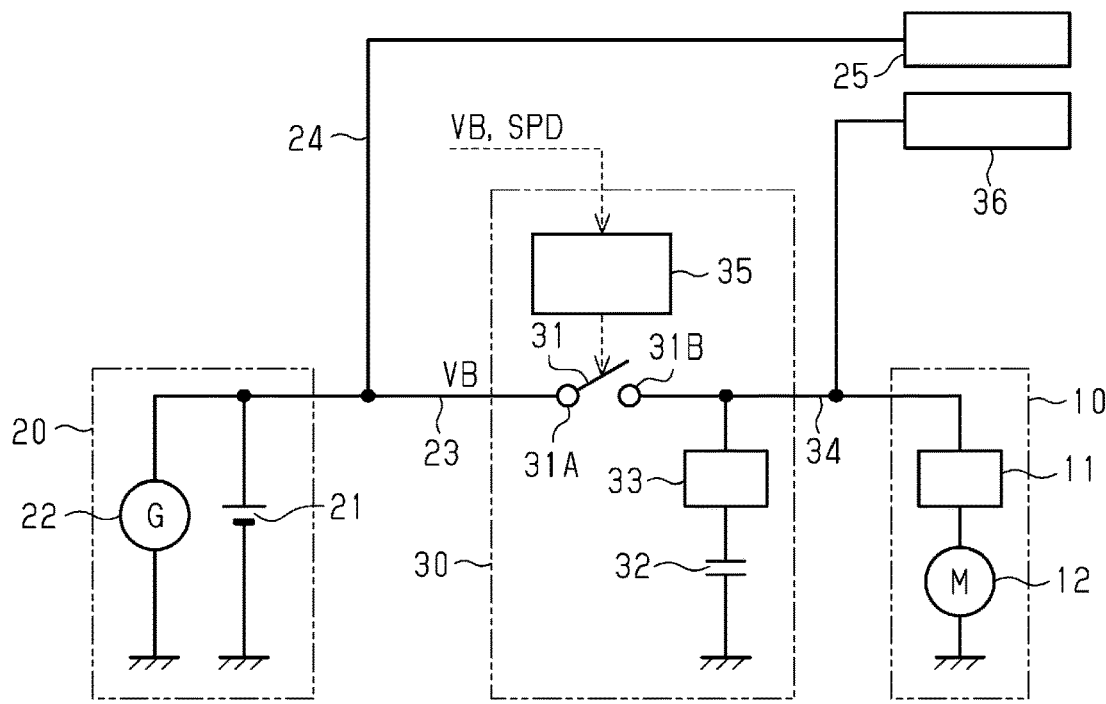
FIG. 1 is a diagram schematically showing an auxiliary power supply apparatus and an electric power steering system according to one embodiment.

As shown in FIG. 1, the electric power steering system of the present embodiment includes an electric power steering apparatus 10, which generates a steering force of the vehicle, and a main power supply apparatus 20, which supplies power to the electric power steering apparatus 10. The electric power steering system further includes an auxiliary power supply apparatus 30, which supplies power to the electric power steering apparatus 10 when the supply voltage from the main power supply apparatus 20 to the electric power steering apparatus 10 drops.

The main power supply apparatus 20 includes a main power supply 21, which is a rechargeable power storage device, and a generator 22, which generates power using rotation of the engine. The main power supply 21 is, for example, a lead-acid battery. The main power supply apparatus 20 is connected to the auxiliary power supply apparatus 30 via a power line 23. The main power supply apparatus 20 is connected to vehicle on-board electrical components other than the electric power steering apparatus 10 via a power line 24. In the following description, the vehicle on-board electrical components other than the electric power steering apparatus 10 will be referred to as other vehicle on-board electrical components 25. The other vehicle on-board electrical components 25 include various electronic control units, windshield wipers, and lighting components.

The auxiliary power supply apparatus 30 includes an on-off switch 31, an auxiliary power supply 32, which is a rechargeable power storage device, and a buck-boost circuit 33. The on-off switch 31 includes a first terminal 31A, which is connected to the main power supply apparatus 20 via the power line 23. Also, the on-off switch 31 includes a second terminal 31B, which is connected to the electric power steering apparatus 10 via the power line 34. The on-off switch 31 is configured as a switch that selectively disconnects or connects a power supply path from the main power supply apparatus 20 to the electric power steering apparatus 10. In the present embodiment, a contactless relay is used as the on-off switch 31.

The auxiliary power supply 32 is connected to the power line 34 via the buck-boost circuit 33. When charging the auxiliary power supply 32, the buck-boost circuit 33 boosts the voltage of power from the power line 34 and delivers the power to the auxiliary power supply 32. When the auxiliary power supply 32 discharges power, the buck-boost circuit 33 lowers the voltage of the power discharged by the auxiliary power supply 32 and delivers the power to the power line 34. In the present embodiment, a capacitor is used as the auxiliary power supply 32.

Further, the auxiliary power supply apparatus 30 includes an operation unit 35, which selectively opens and closes the on-off switch 31. The operation unit 35 is configured as an electronic control circuit that executes processes related to opening and closing of the on-off switch 31. The operation unit 35 includes, for example, a central processing unit (CPU) or a micro-processing unit (MPU). The operation unit 35 preferably includes a memory that stores programs. The memory includes, for example, a nonvolatile memory and a volatile memory. The nonvolatile memory includes, for example, at least one of a read-only memory (ROM), an erasable programmable read-only memory (EPROM), an electrically erasable programmable read-only memory (EEPROM), and a flash memory. The volatile memory includes, for example, a random access memory (RAM). The operation unit 35 is not limited to a device that executes software processing. For example, the operation unit 35 may include a dedicated hardware circuit (for example, an application specific integrated circuit (ASIC)) that executes at least part of processes to be executed through hardware processing. The operation unit 35 is configured to include at least one of a circuit that executes software processing according to programs and a hardware circuit that executes hardware processing. The operation unit 35 receives detection results of a vehicle speed SPD and a voltage VB, which is supplied to the auxiliary power supply apparatus 30 and to the electric power steering apparatus 10 from the main power supply apparatus 20 via the power line 23. Based on these detection results, the operation unit 35 outputs a drive signal to the on-off switch 31, thereby performing the opening-closing operation of the on-off switch 31.

The electric power steering apparatus 10 includes a steering control circuit 11 and a steering motor 12, which generates a steering force of the vehicle. The steering control circuit 11 controls a current supplied to the steering motor 12 in accordance with a steering operation by the driver and the vehicle traveling condition such as the vehicle speed. The electric power steering apparatus 10 may be used in a vehicle that performs automatic steering traveling. In such a case, during the automatic steering traveling, the steering control circuit 11 controls the current supplied to the steering motor 12 in accordance with the vehicle traveling condition and detection results of lanes and surrounding vehicles, without referring to steering operation by the driver.

As described above, the auxiliary power supply apparatus 30 of the present embodiment is disposed on the power supply path from the main power supply apparatus 20 to the electric power steering apparatus 10. The on-off switch 31 in the auxiliary power supply apparatus 30 selectively disconnects or connects the electric power steering apparatus 10 and the auxiliary power supply 32 from or to the main power supply apparatus 20 in accordance with its opening/closing state. Specifically, when the on-off switch 31 is on, that is, closed, the electric power steering apparatus 10 and the auxiliary power supply 32 are connected to the main power supply apparatus 20. On the other hand, when the on-off switch 31 is off, that is, open, the electric power steering apparatus 10 and the auxiliary power supply 32 are disconnected from the main power supply apparatus 20.

The electric power steering system of the present embodiment includes a warning device 36. The warning device 36 gives warning to the driver through acoustic means or visual means when it is predicted that the steering motor 12 of the electric power steering apparatus 10 cannot generate a required steering force due to insufficient power. The warning device 36 is connected to the power line 34. The warning device 36 is connected to one of the two terminals 31A and 31B of the on-off switch 31. Specifically, the warning device 36 is connected to the second terminal 31B, which is connected to the electric power steering apparatus 10, that is, to the steering motor 12.

Figure 2:
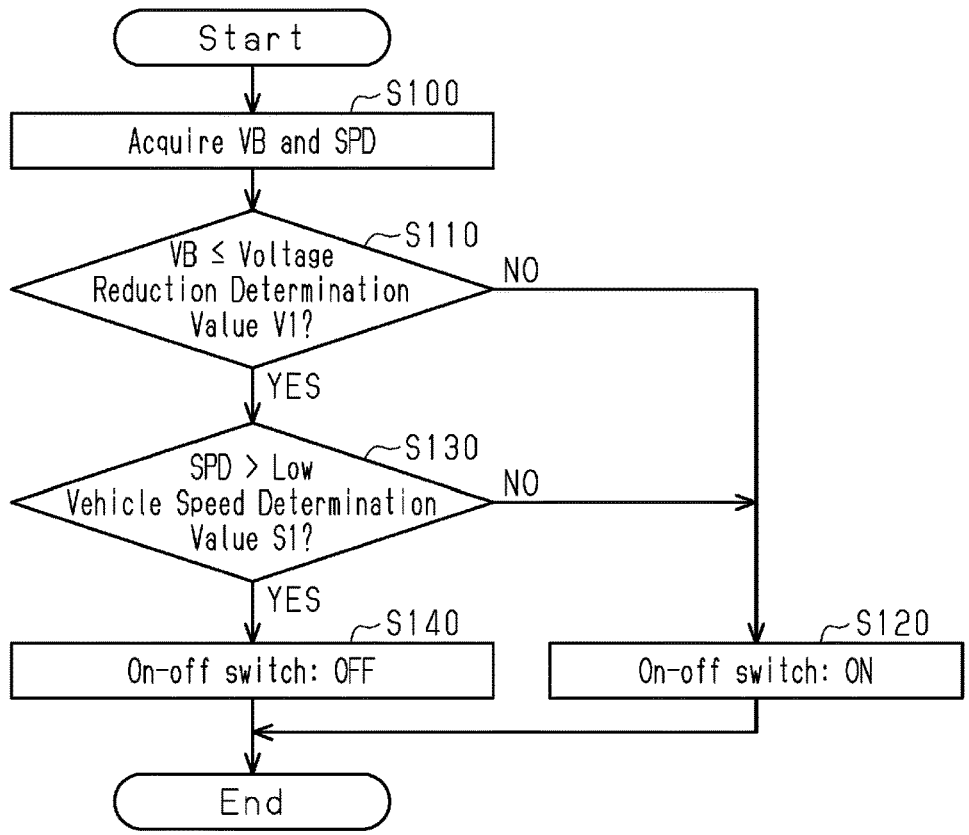
FIG. 2 is a flowchart showing an on-off switch operating process executed by an operation unit provided in the auxiliary power supply apparatus of FIG. 1.

The following describes, with reference to FIG. 2, a process related to the opening/closing operation of the on-off switch 31 performed by the operation unit 35 of the auxiliary power supply apparatus 30. The operation unit 35 repeatedly executes the process shown in FIG. 2 at predetermined control cycles.

When the process is started in each control cycle, the operation unit 35 first acquires the detection results of the voltage VB and the vehicle speed SPD in step S100. Subsequently, in step S110, the operation unit 35 determines whether the voltage VB is less than or equal to a specified voltage reduction determination value V1. If the voltage VB is greater than the voltage reduction determination value V1 (step S110: NO), the operation unit 35 turns on the on-off switch 31 in step S120, and ends the process of the current control cycle. In contrast, if the voltage VB is less than or equal to the voltage reduction determination value V1 (step S110: YES), the operation unit 35 proceeds to step S130. The voltage reduction determination value V1 is set to the lower limit of a range of the voltage VB in which the electric power steering apparatus 10 continues to operate properly.

When proceeding to step S130, the operation unit 35 determines whether the vehicle speed SPD is greater than a specified low vehicle speed determination value S1 in step S130. If the vehicle speed SPD is less than or equal to the low vehicle speed determination value S1 (step S130: NO), the operation unit 35 proceeds to step S120 to turn on the on-off switch 31 and then ends the process of the current control cycle. In contrast, if the vehicle speed SPD is greater than the low vehicle speed determination value S1 (step S130: YES), the operation unit 35 proceeds to step S140 to turn off the on-off switch 31 and then ends the process of the current control cycle.

As described above, the operation unit 35 switches the on-off switch 31 from an ON state to an OFF state on the condition that the voltage VB, which is supplied to the auxiliary power supply apparatus 30 from the main power supply apparatus 20, is less than or equal to the voltage reduction determination value V1, and the vehicle speed SPD is greater than the low vehicle speed determination value S1. When the on-off switch 31 is in the OFF state, the operation unit 35 switches the on-off switch 31 from the OFF state to the ON state if the voltage VB exceeds the voltage reduction determination value V1 or if the vehicle speed SPD becomes less than or equal to the low vehicle speed determination value S1.

Figure 3:
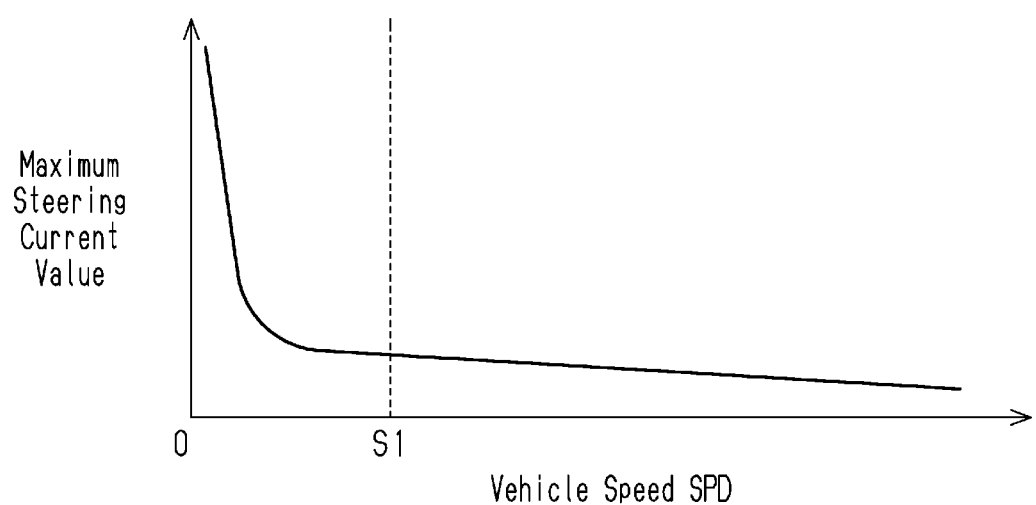
FIG. 3 is a graph showing a relationship between a vehicle speed and a current through the electric power steering apparatus during a steering operation.

FIG. 3 shows a relationship between the vehicle speed SPD and a maximum steering current value, which is the maximum value of the current required by the steering motor 12 during steering. As shown in FIG. 3, the maximum steering current value increases as the vehicle speed SPD decreases. Particularly, when the vehicle is stationary or creeping, steering action is "dry steering" and requires a large torque, so that the maximum steering current value is significantly large. The above-described low vehicle speed determination value S1 is set to a vehicle speed that is slightly greater than the upper limit of a range of the vehicle speed SPD in which the maximum steering current value is significantly large due to dry steering. In the following description, the range of the vehicle speed SPD less than or equal to the low vehicle speed determination value S1 will be referred to as a low vehicle speed range.

An operation and advantages of the present embodiment will now be described.

With the electric power steering system of the present embodiment, the electric power steering apparatus 10 is normally operated with the power supplied by the main power supply apparatus 20 with the on-off switch 31 of the auxiliary power supply apparatus 30 being in the ON state. The main power supply apparatus 20 also supplies power to the other vehicle on-board electrical components 25 in addition to the electric power steering apparatus 10. At this time, the auxiliary power supply 32 is charged with power supplied by the main power supply apparatus 20.

The main power supply apparatus 20 is designed to supply a necessary and sufficient power to the electric power steering apparatus 10 regardless of the operating states of the other vehicle on-board electrical components 25. However, when the discharge voltage of the main power supply 21 is reduced due to age-related deterioration, an increase in the power consumption of the other vehicle on-board electrical components 25 may hinder the main power supply apparatus 20 from supplying a sufficient power to the electric power steering apparatus 10. When the power supply to the electric power steering apparatus 10 is insufficient, the steering motor 12 cannot generate sufficient force. This increases the force that is required to be applied by the driver to perform a steering operation. Also, in the case of the electric power steering apparatus 10 performing automatic steering traveling, the automatic steering traveling can no longer be continued.

However, the operation unit 35 of the auxiliary power supply apparatus 30 switches the on-off switch 31 from the ON state to the OFF state when the voltage VB, which is supplied to the electric power steering apparatus 10 by the main power supply apparatus 20, becomes less than or equal to the voltage reduction determination value V1 in a state in which the vehicle speed SPD is greater than the low vehicle speed determination value S1. This disconnects the electric power steering apparatus 10 and the auxiliary power supply 32 from the main power supply apparatus 20. Then, the auxiliary power supply 32 discharges the power charged up to that moment and supplies that power to the electric power steering apparatus 10. Accordingly, the operation of the electric power steering apparatus 10 is continued for a certain amount of time. Also, the electric power steering system of the present embodiment supplies some of the power discharged by the auxiliary power supply 32 at this time to the warning device 36. This causes the warning device 36 to perform notification to the driver.

On the other hand, the operation unit 35 maintains the on-off switch 31 in the ON state if the vehicle speed SPD is less than or equal to the low vehicle speed determination value S1 even in a case in which the voltage VB is less than or equal to the voltage reduction determination value V1. At this time, the electric power steering apparatus 10 and the warning device 36 receive both the power delivered by the main power supply apparatus 20 via the power line 23 and the power discharged by the auxiliary power supply 32.

The auxiliary power supply 32 of the above-described electric power steering system needs to have a sufficient capacity for maintaining operation of the electric power steering apparatus 10 for a certain amount of time in a state in which the on-off switch 31 is in the OFF state. As described above, the maximum steering current value of the steering motor 12 is significantly large in a region close to the value 0 of the vehicle speed SPD. Thus, in a case in which the on-off switch 31 is turned off in response to a drop of the voltage VB, regardless of the vehicle speed SPD, the auxiliary power supply 32 would need to have a sufficiently large capacity that is capable of supplying, for a certain amount of time, a current corresponding to the maximum steering current value at the time when the vehicle speed SPD is in a region close to 0. However, in the present embodiment, when the vehicle speed SPD is less than or equal to the low vehicle speed determination value S1, the on-off switch 31 is not switched from the ON state to the OFF state even if the voltage VB is less than or equal to the voltage reduction determination value V1. This reduces the maximum value of the power required to maintain the operation of the electric power steering apparatus 10 for a certain amount of time in a state in which the on-off switch 31 is in the OFF state, so that the maximum value is smaller than that in a case in which the on-off switch 31 is put in the OFF state regardless of the vehicle speed SPD.

The electric power steering system and the auxiliary power supply apparatus 30 according to the above-described present embodiment has the following advantages.

(1) The operation unit 35 in the auxiliary power supply apparatus 30 of the present embodiment switches the on-off switch 31 from the ON state to the OFF state when the voltage VB, which is supplied to the auxiliary power supply apparatus 30 from the main power supply apparatus 20, is less than or equal to the voltage reduction determination value V1, and the vehicle speed SPD is greater than the low vehicle speed determination value S1. Thus, the power supply to the electric power steering apparatus 10 by the auxiliary power supply 32 alone in a state in which the on-off switch 31 is in the OFF state is not performed in a low vehicle speed range, in which a large current is required for the operation of the electric power steering apparatus 10. This allows the capacity of the auxiliary power supply 32 to be reduced.

(2) Even if the vehicle speed SPD is above the low vehicle speed determination value S1 when the on-off switch 31 is turned off, a subsequent drop of the vehicle speed SPD to a value less than or equal to the low vehicle speed determination value S1 would increase the current value required for the operation of the steering motor 12, so that the power stored in the auxiliary power supply 32 may be unable to maintain the operation of the electric power steering apparatus 10 for a sufficient period of time. In this regard, the operation unit 35 in the auxiliary power supply apparatus 30 of the present embodiment switches the on-off switch 31 from the OFF state to the ON state in a case in which the vehicle speed SPD becomes less than or equal to the low vehicle speed determination value S1 when the on-off switch 31 is in the OFF state. When the on-off switch 31 is switched from the OFF state to the ON state, power is supplied to the electric power steering apparatus 10 from both the main power supply apparatus 20 and the auxiliary power supply 32. At this time, the auxiliary power supply 32 supplies the electric power steering apparatus 10 with an amount of power corresponding to the insufficiency of the power supplied by the main power supply apparatus 20. Therefore, when the vehicle speed SPD drops after the on-off switch 31 is switched to the OFF state, the operation of the electric power steering apparatus 10 is maintained easily.

(3) The warning device 36 is connected to one of the two terminals 31A and 31B of the on-off switch 31. Specifically, the warning device 36 is connected to the second terminal 31B, which is connected to the electric power steering apparatus 10, that is, to the steering motor 12. The second terminal 31B is also connected to the auxiliary power supply 32. In other words, the warning device 36 is connected to the power line 34, which is the power supply path that connects the on-off switch 31 to the electric power steering apparatus 10, that is, to the steering motor 12. The power line 34 is also connected to the auxiliary power supply 32. Accordingly, the operation of the warning device 36 is readily ensured when the voltage VB drops.

The above-described embodiment may be modified as follows. The above-described embodiment and the following modifications can be combined as long as the combined modifications remain technically consistent with each other.

In the above-described embodiment, the warning device 36 is connected to the second terminal 31B of the on-off switch 31, which is connected to the electric power steering apparatus 10. However, as in the case of the other vehicle on-board electrical components 25, the main power supply apparatus 20 may directly supply power to the warning device 36.

The operation unit 35 of the above-described embodiment switches the on-off switch 31 from the OFF state to the ON state if the vehicle speed SPD becomes less than or equal to the low vehicle speed determination value S1 after the on-off switch 31 is switched to the OFF state. However, the operation unit 35 may maintain the on-off switch 31 in the OFF state until the voltage VB exceeds the voltage reduction determination value V1 even if the vehicle speed SPD becomes less than or equal to the low vehicle speed determination value S1 after the on-off switch 31 is switched to the OFF state.

In the above-described embodiment, the main power supply apparatus 20 includes a lead rechargeable battery as the main power supply 21. However, the configuration of the main power supply apparatus 20 may be changed. For example, a hybrid vehicle includes a high-voltage battery such as a lithium-ion battery as the power source for supplying power to a traveling motor. The power supplied by the high-voltage battery, the voltage of which is lowered by DC-to-DC converter, is supplied to vehicle on-board electrical components. In such a hybrid vehicle, the high-voltage battery and the DC-to-DC converter may be used as the main power supply apparatus 20.

In the above-described embodiment, a capacitor is used as the auxiliary power supply 32. However, a power storage device other than a capacitor, such as a rechargeable battery, may be used as the auxiliary power supply 32.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electric power steering system, comprising:
a steering motor that is configured to generate a steering force of a vehicle when supplied with power;
a main power supply apparatus configured to supply the power to the steering motor;
an auxiliary power supply that is a rechargeable power storage device;
an on-off switch that is configured to be switched between an ON state in which the steering motor and the auxiliary power supply are connected to the main power supply apparatus and an OFF state in which the steering motor and the auxiliary power supply are disconnected from the main power supply apparatus;
an operation unit that is configured to operate the on-off switch; and
a warning device that gives warning to a driver when it is predicted that the power supplied to the steering motor will be insufficient,
wherein the operation unit is configured to switch the on-off switch from the ON state to the OFF state to supply electric power to the steering motor by the auxiliary power supply only of the main power supply apparatus and the auxiliary power supply on a condition that a voltage supplied to the steering motor from the main power supply apparatus is less than or equal to a specified voltage reduction determination value and a vehicle speed is greater than a specified low vehicle speed determination value, and the warning device and the auxiliary power supply are connected to a power supply path between the on-off switch and the steering motor.

2. The electric power steering system according to claim 1, wherein the operation unit is configured to switch the on-off switch from the OFF state to the ON state if the vehicle speed becomes less than or equal to the low vehicle speed determination value in a state in which the on-off switch is in the OFF state.

3. The electric power steering system according to claim 1, wherein:
the on-off switch includes:
a first terminal connected to the main power supply apparatus; and
a second terminal connected to the steering motor, and
the warning device is connected to the second terminal of the on-off switch.

4. The electric power steering system according to claim 1, wherein when the vehicle speed is less than or equal to the specified low vehicle speed determination value, the operation unit maintains the on-off switch in the ON state to prevent power supply to the steering motor by the auxiliary power supply alone even if the voltage is less than or equal to the specified voltage reduction determination value.

* * * * *